Patented Aug. 5, 1952

2,606,099

UNITED STATES PATENT OFFICE 2,606,099

REGENERATION OF ALKALINE SOLUTIONS USED IN THE REMOVAL OF SULFUR CONTAMINANTS FROM HYDROCARBON OILS

John Happel, Brooklyn, and Stephen P. Cauley, Jackson Heights, N. Y., assignors to Socony-Vacuum Oil Company, Incorporated, a corporation of New York No Drawing. Application June 11, 1943, Serial No. 490,490

8 Claims. (Cl. 23—184)

This application is a continuation-in-part of our co-pending application Serial Number 463,688, filed October 29, 1942, for a Method of Sweetening Hydrocarbons, now abandoned.

This invention is directed to the treatment of hydrocarbon oils for the reduction of the mercaptan sulfur content thereof, particularly intended to provide a finished gasoline fraction which is either "sweet" to the "doctor" test or is sufficiently low in sulfur to be acceptable under specifications wherein the doctor test is not used and total sulfur content is determined.

In treating hydrocarbons, such as straight run gasoline, natural gasoline, cracked gasoline and the like, to render them sweet to the "doctor" test, the objective is to remove materials of the nature of hydrogen sulfide, mercaptans or the like or to convert them to innocuous compounds. Washing with aqueous solutions of strong alkalies, such as caustic soda will remove most of the hydrogen sulfide and some, but not all, of the mercaptans. Washing with aqueous caustic to which some material has been added as a "solutizer," or solubility promoter, enables the caustic to dissolve and remove more or all of the mercaptans. Butylene glycols, butyric acids, and phenolic material are so used. Older methods make use of sodium plumbite formed by dissolving litharge in caustic soda, the effect here being to convert mercaptans to mercaptides and later to disulfides, which are innocuous to the doctor test, by addition of free sulfur.

In general, all processes of this kind leave something to be desired, and this field, one of the oldest in petroleum refining, is still the subject of active research.

This invention has for its object the provision of a method for treatment of light petroleum hydrocarbons of the nature of gasoline, natural gasoline, cracked gasoline, kerosenes, solvents and the like, capable of effecting very considerable reductions in the mercaptan sulfur content of the material so treated and particularly capable of providing a process of this general kind in which the reagent useful for the removal of mercaptan sulfur may be regenerated cheaply, effectively and with certainty. As one phase of this general object, the process provides the possibility of recovering disulfides of paraffin hydrocarbons of low molecular weight as products.

This invention is based upon the discovery that if small percentages of polyhydroxy benzene materials be added to a caustic solution which has been utilized or is to be utilized as a reagent for the removal of mercaptan sulfur and similar acidic materials, that the mercaptans may be readily removed and the spent caustic solution regenerated for re-use by blowing with air or other oxidizing gas under certain controlled conditions.

It is known that caustic soda solution is a competent reagent for the removal of mercaptans of low molecular weight and as such it finds a position as a most useful treating agent for gasoline fractions from various sources containing such bodies. While this same reagent is less efficient in the removal of higher mercaptans, it is capable, when used in sufficient quantities, of effecting such removal. More usually the caustic solution is reenforced in its ability to remove the higher mercaptans by the addition of materials spoken of in the art as "solutizers" because they increase the mercaptan removal power of the caustic. Many materials, including glycols, such as butylene glycol, monocarboxylic acids such as butyric acid, and phenolic materials, such as cresol are so used as solutizers.

In all cases, however, it has been found necessary to regenerate the caustic solutions by steaming to remove mercaptans. The relative cost of this procedure increases sharply as the mercaptan sulfur concentration of the treating solution decreases. High regeneration costs of steaming therefore limit the flexibility of treating processes, in that more elaborate mercaptan removal equipment must be used in conjunction with regeneration by steaming than would be required with a more efficient method of regeneration.

It has been found that when polyhydroxy benzenes, such as pyrogallol, hydroquinone, resorcinol, and the like are present in small amounts in the caustic solution, either with or without solutizers, that a ready, effective, and cheap regeneration can be conducted, under certain conditions hereinafter defined, by a simple process of blowing with air or other oxidizing gas at atmospheric temperatures.

The process herein proposed is one wherein a gasoline or other light hydrocarbon fraction containing mercaptan sulfur is contacted in an oxygen free contacting system of the type usual in the industry, with a caustic alkali reagent of the type normally used for removal of mercaptan sulfur, the reaction in this stage not being one of converting mercaptans to disulfides but being merely a removal of the mercaptans from the oil by combination with the reagent in the form of mercaptides. This reagent containing mercaptans is then separated from the treated oil and removed to a point external to the oil treating zone for regeneration. It is there regenerated by blowing with air resulting in the formation of disulfides which separate in an oily layer from the aqueous alkaline reagent and may be removed therefrom. The reagent thus regenerated is returned to the treating process. This operation differs from previously conducted operations of this kind wherein oxidation regeneration can be gotten, if at all, only with exceeding slowness. In our operation, we add to the caustic alkaline reagent, prior to regeneration, a small amount of a polyhydroxy benzene, such as pyrogallol, hydroquinone or resorcinol. These materials catalyze oxidation of mercaptides to disulfides. A major characteristic of the process arises from the fact that the oxidation regeneration is controlled. If allowed to go to completion, the mercaptides are first reduced to a certain low level and then the polyhydroxy benzene is itself oxidized, becoming useless for further utilization in the process. We have found that if the oxidization be carried only to a certain level of mercaptan sulfur, that the polyhydroxy benzenes are not themselves oxidized and remain in the solution capable of continued re-use except for an extremely minor amount of makeup.

We are aware that it has previously been proposed to utilize caustic alkaline reagents containing poly hydroxy benzenes in a doctor sweetening reaction in which the treating reagent containing the catalyst was activated by a mild oxidation and then contacted with oil to give rise in the contacting operation to a change of mercaptans to disulfides which remain in the oil, the treating reagent then being removed and revivified by a mild oxidizing reaction and returned. It is quite clear that such a process would effect no reduction of total sulfur in the oil. It would merely alter the form of the sulfur compounds from the mercaptan to the disulfide form. Insofar as a process for merely "sweetening" the oil, this is capable. However, since sulfur in the form of disulfides exhibits a very marked effect in lowering the lead response of a gasoline, that is, in lowering the amount by which its antiknock capability may be increased upon the addition of a specified amount of tetra ethyl lead, processes which merely sweeten are no longer highly useful. To properly control lead response, it is necessary, not to change the type of sulfur compounds in the oil but actually to remove them. This is what is accomplished by our process. The mercaptans are dissolved in the caustic and separated from the oil, then they are changed to disulfides and separated from the caustic.

When so utilized, the caustic alkaline solutions containing poly hydroxy benzene materials exhibit a high capability for catalyzing the oxidation of mercaptans to disulfides. This capability may be expressed as a rate of regeneration. The following table shows some figures concerning this rate, the figures being derived from laboratory experiments conducted under careful control to eliminate commercial process variables but which reflect actual commercial operation.

The procedure used in this case was as follows. A treating solution was carefully prepared consisting of 5 N NaOH and 1 N para-cresol containing 1% of mercaptan sulfur, and the catalyst added to this solution after the mercaptans. The solution is shaken with air in a separatory funnel for one minute, the ratio of air to solution being 6 to 1. The air is then replaced by flushing with low pressure air for ten seconds and the procedure repeated. The rate of fall of mercaptan concentration is a measure of the activity of the catalyst. The following table gives a number of results obtained by this procedure:

TABLE I

*Mercaptan sulfur regeneration rates, percent/min., 1 N Na p-cresylate solutions containing n-butyl mercaptan*

| Constituent Conc., Percent | Hydroquinone | Pyrogallol |
|---|---|---|
| 0 | 0.003 | 0.003 |
| 0.25 | 0.107 | 0.295 |
| 0.50 | 0.163 | 0.334 |
| 1.00 | 0.163 | 0.350 |

These figures indicate a high catalytic activity for oxidizing mercaptans possessed by relatively quite small amounts of poly hydroxy benzenes.

It was previously remarked that it is necessary to control the degree of oxidation. Certain tabular data is presented following to show the amount of sulfur in the form of mercaptan sulfur which must be retained in the solution undergoing regeneration to protect the oxidation catalyst and prevent its oxidation. Once again these are laboratory tests but reflect quite accurately commercial operation.

The procedure used in conducting these tests was as follows: A solution containing five gram moles/liter of free NaOH, one gram mole of sodium cresylate, and a given concentration of oxidation catalyst is prepared for testing. A concentration of n-butyl mercaptan greater than necessary for stabilization is then added to the solution. The solution is then alternately regenerated by air blowing and refortified with mercaptan for a total of seven such operations. The degree of regeneration is controlled so that the deviation in mercaptan concentration is approximately 0.2% by weight during each cycle. At the end of seven cycles the solution is analyzed for its catalyst content. If no appreciable reduction in catalyst concentration is obtained during the above operation the process is repeated using the same solution but at a lower mercaptan concentration. Whenever the catalyst content is found to have been appreciably reduced by this procedure it is evident that the mercaptan concentration present was not sufficient for catalyst stabilization. Results are given in the following table:

TABLE II

*Limits of RSH conc. for protection of oxidation catalysts*

| Material | n-Butyl Mercaptan Used Catalyst Conc. Weight Percent | S (RSH) Conc., Weight Percent |
|---|---|---|
| Pyrogallol | 0.25 | 0.35 |
| Do | 0.50 | [1] 0.45 |
| Do | 1.0 | 0.60 |
| Do | 1.5 | 0.75 |
| Hydroquinone | 0.5 | 0.55 |
| Do | 1.0 | 0.50 |
| Do | 1.5 | 0.65 |

[1] N-Propyl Mercaptan used in this determination.

Thus it will be seen that in using such reagents under the indicated control, a very effective operation is attained. The operation is of interest from several respects. As a major cost item, the cost of steaming is replaced by the cost of supplying air at relatively low pressure, The amount of air used is relatively small, usual use of equipment comparable with a fractionation, that is, a bubble plate tower of fair height, while the air blowing may be accomplished with relatively simple and inexpensive equipment. The amount of air used is relatively small, usually not exceeding over three or four times the theoretical. Due to the ability of control of regeneration, the caustic solutions utilized need not be of unduly high viscosity since they may be regenerated to the point where they are quite efficient as pick-up agents, even at moderate concentrations of caustic.

Of great importance is the fact that by this process, the sulfur is actually removed from the oil and not merely converted in form and allowed to remain in the oil.

The caustic solution may be either sodium hydroxide or potassium hydroxide and it will usually be a solution of a concentration between about 10% caustic and 45% caustic. From the standpoint of efficiency, potassium hydroxide is to be preferred. However, cost relationships will probably more usually indicate sodium hydroxide as the alkali to be used. The concentration of the poly hydroxy benzene in the treating solution may vary. It has been found that from 1% to 3% by weight appears to be the most effective concentration, although concentrations as low as 0.1% may be used. On the upper end, concentrations higher than 5.0% appear at present to yield diminishing returns. The treating solution may be contacted with the oil to be treated in any conventional treating system, such as in a packed tower or any system providing countercurrently arranged contacting stages. The amount of solution to be used may be varied to the individual treating requirements, but in general, will be from 1–50% by volume of the oil being treated. The treating temperature may vary. For practical operation, a temperature of 75–100° F. is recommended. Since this is quite a usual atmospheric temperature or readily attainable around an oil refinery, this phase of the operation presents no difficulties.

By reference to Table II herein it will be recognized that the degree of regeneration, which is the important point of control in the process, is dependent upon the concentration of the oxidation catalyst employed and that the regeneration should be so conducted as to leave not less than about 0.35% by weight of sulfur calculated as mercaptan sulfur in the reagent when the concentration of the oxidation catalyst is about 0.25% by weight. It is also obvious that larger amounts must be utilized for protection of larger concentrations of catalyst and smaller amounts for the protection of smaller concentrations of catalyst.

We claim:

1. The process of regenerating an aqueous alkali solution containing weakly acidic sulphur compounds and a small amount of an oxidation promoter which catalytically promotes the oxidation of said weakly acidic sulphur compounds, and which itself is capable of air-oxidation, substantially consisting of a trihydroxy carbocyclic compound free of carboxyl and esterified carboxyl groups and having three hydroxyl groups attached to the carbon atoms of a single benzene ring and oxidizable to a quinone form, which solution has been used to extract said weakly acidic sulphur compounds from hydrocarbon fluids, comprising: contacting said solution with an oxygen-containing gas in such manner as to oxidize said sulphur compounds but to leave sufficient amount of unoxidized sulphur compounds in said solution to substantially reduce the quinone form produced in the oxidation to the original trihydroxy form upon standing in the solution, and removing the oxidized sulphur compounds from the solution.

2. The process of regenerating an aqueous alkali solution containing weakly acidic sulphur compounds and a small amount of an oxidation promoter which catalytically promotes the oxidation of said weakly acidic sulphur compounds, and which itself is capable of air-oxidation, substantially consisting of a dihydroxy benzene compound free of carboxyl and esterified carboxyl groups and oxidizable to a quinone form, which solution has been used to extract said weakly acidic sulphur compounds from hydrocarbon fluids, comprising: contacting said solution with an oxygen-containing gas in such manner as to oxidize said sulphur compounds but to leave sufficient amount of unoxidized sulphur compounds in said solution to substantially reduce the quinone form produced in the oxidation to the original dihydroxy form upon standing in the solution, and removing the oxidized sulphur compounds from the solution.

3. The process of regenerating an aqueous alkali solution containing weakly acidic sulfur compounds and a small amount of an oxidation promoter which accelerates the rate of oxidation of said weakly acidic sulfur compounds in the presence of oxygen and which itself is deactivated by air in the absence of a minimum concentration of said weakly acidic sulfur compounds, substantially consisting of a trihydroxy carbocyclic compound free of carboxyl and esterified carboxyl groups and having three hydroxyl groups attached to the carbon atoms of a single benzene ring, which solution has been used to extract said weakly acidic sulfur compounds from hydrocarbon fluids, comprising: contacting said solution with an oxygen-containing oxidizing gas until a substantial portion of said weakly acidic sulfur compounds is oxidized but at least about 0.1 per cent of unoxidized weakly acidic sulfur compounds and sufficient to maintain the activity of said oxidation promoter remains in said solution, and removing the oxidized sulfur compounds from the solution.

4. The process of regenerating an aqueous alkali solution containing weakly acidic sulfur compounds and a small amount of an oxidation promoter which accelerates the rate of oxidation of said weakly acidic sulfur compounds in the presence of oxygen and which itself is deactivated by air in the absence of a minimum concentration of said weakly acidic sulfur compounds, substantially consisting of a dihydroxy benzene compound free of carboxyl and esterified carboxyl groups, which solution has been used to extract said weakly acidic sulfur compounds from hydrocarbon fluids, comprising: contacting said solution with an oxygen-containing oxidizing gas until a substantial portion of said weakly acidic sulfur compounds is oxidized but at least about 0.1 per cent of unoxidized weakly sulfur compounds and sufficient to maintain the activity of said oxidation promoter remains in said solution, and removing the oxidized sulfur compounds from the solution.

5. The process of regenerating an alkaline solution containing weakly acidic sulfur compounds and a small amount of an oxidation promoter which accelerates the rate of oxidation of said weakly acidic sulfur compounds in the presence of oxygen and which itself is deactivated by air in the absence of a minimum concentration of said weakly acidic sulfur compounds, substantially consisting of a compound selected from the group consisting of carbocyclic compounds having three hydroxyl groups attached to a single benzene ring and free of carboxyl and esterified carboxyl groups and carbocyclic compounds having two hydroxyl groups attached to a single benzene ring and free of carboxyl and esterified carboxyl groups, which solution has been used to extract said weakly acidic sulfur compounds from hydrocarbon fluids, comprising: contacting said solution with an oxidizing gas containing free oxygen for such limited time that said weakly acidic sulfur compounds are oxidized to an extent that only a small portion thereof remains sufficient to substantially reduce any portion of said carbocyclic compound that may become oxidized.

6. The process of regenerating an alkaline solution containing mercaptans in the form of mercaptides and a small amount of an oxidation promoter which accelerates the rate of oxidation of said mercaptans to polysulfides in the presence of oxygen and which itself is deactivated by air in the absence of a minimum concentration of said mercaptans, substantially consisting of a compound selected from the group consisting of carbocyclic compounds having three hydroxyl groups attached to a single benzene ring and free of carboxyl and esterified carboxyl groups and carbocyclic compounds having two hydroxyl groups attached to a single benzene ring and free of carboxyl and esterified carboxyl groups, which solution has been used to extract said mercaptans from hydrocarbon fluid, comprising: contacting said solution with an oxidizing gas containing free oxygen for such limited time that said mercaptides are oxidized to an extent that only a small portion thereof remains sufficient to substantially reduce any portion of said carbocyclic compound that may become oxidized.

7. The process of regenerating an alkaline solution containing mercaptans in the form of mercaptides and a small amount of hydroquinone sufficient to accelerate the rate of oxidation of said mercaptans to polysulfides in the presence of oxygen, said hydroquinone being deactivated by air in the absence of a minimum concentration of said mercaptans, which solution has been used to extract said mercaptans from hydrocarbon fluids, comprising: contacting said solution with an oxidizing gas containing free oxygen for such limited time that said mercaptides are oxidized to an extent that only a small portion thereof remains sufficient to substantially reduce any portion of said hydroquinone that may become oxidized.

8. The process of regenerating an alkaline solution containing mercaptans in the form of mercaptides and a small amount of pyrogallol sufficient to accelerate the rate of oxidation of said mercaptans to polysulfides in the presence of oxygen, said pyrogallol being deactivated by air in the absence of a minimum concentration of said mercaptans, which solution has been used to extract said mercaptans from hydrocarbon fluids, comprising: contacting said solution with an oxidizing gas containing free oxygen for such limited time that said mercaptides are oxidized to an extent that only a small portion thereof remains sufficient to substantially reduce any portion of said pyrogallol that may become oxidized.

JOHN HAPPEL.
STEPHEN P. CAULEY.

REFERENCES CITED

The following references are of record in the file of this patent:

UNITED STATES PATENTS

| Number | Name | Date |
|---|---|---|
| 1,855,353 | Jacobsen | Apr. 26, 1932 |
| 1,943,744 | Rosenstein | Jan. 16, 1934 |
| 2,001,715 | Fischer | May 21, 1935 |
| 2,015,038 | Pevere | Sept. 7, 1935 |
| 2,297,621 | Henderson et al. | Sept. 29, 1942 |
| 2,315,530 | Loyd | Apr. 6, 1943 |
| 2,316,092 | Loyd | Apr. 6, 1943 |
| 2,317,054 | Henderson et al. | Apr. 20, 1943 |
| 2,341,915 | Henderson et al. | Feb. 15, 1944 |
| 2,341,917 | Henderson et al. | Feb. 15, 1944 |
| 2,516,837 | Happel et al. | Aug. 1, 1950 |

FOREIGN PATENTS

| Number | Country | Date |
|---|---|---|
| 126,544 | Hungary | Mar. 17, 1941 |